(12) United States Patent
Chen

(10) Patent No.: US 7,744,107 B2
(45) Date of Patent: Jun. 29, 2010

(54) FOUR-BAR LINKAGE SUSPENSION DEVICE FOR A WHEELED VEHICLE

(75) Inventor: Hsueh-Yi Chen, Tainan Hsien (TW)

(73) Assignee: Hsueh-Yi Chen (TW)

( * ) Notice: Subject to any disclaimer, the term of this patent is extended or adjusted under 35 U.S.C. 154(b) by 86 days.

(21) Appl. No.: 12/039,142

(22) Filed: Feb. 28, 2008

(65) Prior Publication Data

US 2009/0218779 A1 Sep. 3, 2009

(51) Int. Cl.
*B62K 25/24* (2006.01)
(52) U.S. Cl. .................................... 280/276
(58) Field of Classification Search ............... 280/276, 280/277, 275, 286, 283; 180/219
See application file for complete search history.

(56) References Cited

U.S. PATENT DOCUMENTS

| | | | | |
|---|---|---|---|---|
| 913,961 A * | 3/1909 | Levedahl | | 280/276 |
| 940,245 A * | 11/1909 | Gates | | 280/276 |
| 946,143 A * | 1/1910 | Levedahl | | 280/276 |
| 1,042,480 A * | 10/1912 | Ridgway | | 280/276 |
| 1,096,417 A * | 5/1914 | Ekstrom | | 280/277 |
| 1,223,572 A * | 4/1917 | Drew | | 280/276 |
| 1,251,992 A * | 1/1918 | Drew | | 280/276 |
| 5,441,291 A * | 8/1995 | Girvin, III | | 280/276 |
| 5,743,547 A * | 4/1998 | Voss et al. | | 280/277 |
| 5,749,590 A * | 5/1998 | Roerig | | 280/276 |
| 6,517,095 B1 * | 2/2003 | Lansac et al. | | 280/276 |
| 2002/0084619 A1 * | 7/2002 | Odom | | 280/276 |
| 2004/0036250 A1 * | 2/2004 | Kofuji | | 280/276 |

FOREIGN PATENT DOCUMENTS

JP 01204888 A * 8/1989

* cited by examiner

*Primary Examiner*—Lesley Morris
*Assistant Examiner*—Wesley Potter
(74) *Attorney, Agent, or Firm*—Choate, Hall & Stewart, LLP

(57) ABSTRACT

A shock-absorbing suspension device includes a mounting rod mounted on a wheeled vehicle frame, a wheel rod mounted on a vehicle wheel axle and forward of the mounting rod, a counteracting member pivotally mounted on the mounting rod and having forward and rearward ends forward of the wheel rod, a primary linking bar disposed to couple one of the forward and rearward ends to the wheel rod so as to permit swinging of the counteracting member, a cantilever arm extending forward from the mounting rod to terminate at a bearing end, and a force transmitting member disposed to couple the bearing end to the other one of the forward and rearward ends to thereby minimize the impact of shock on the mounting rod.

7 Claims, 10 Drawing Sheets

FOUR-BAR LINKAGE SUSPENSION DEVICE FOR A WHEELED VEHICLE

BACKGROUND OF THE INVENTION

1. Field of the Invention

This invention relates to a shock-absorbing suspension device for a wheeled vehicle, more particularly to a shock-absorbing suspension device for coupling a frame of the wheeled vehicle with a wheel axle.

2. Description of the Related Art

A conventional shock-absorbing suspension device disclosed in U.S. Pat. No. 913,961 includes upper and lower vertically swinging links which are loosely connected between a front fork and a steering head of a bicycle frame, and a spring cushioning member which is disposed between a crossbar of the front fork and the steering head so as to absorb or cushion shocks and jars transmitted to the bicycle frame due to passing of the bicycle over rough and uneven roadways.

However, since the moving stroke of the swinging links is short, a large amount of shock is still transmitted to the bicycle frame, thereby reducing the shock absorbing of the device.

SUMMARY OF THE INVENTION

An object of the present invention is to provide a shock-absorbing suspension device with a counteracting member which is movable upwards and downwards so as to effectively dampen shocks transmitted to a frame of a wheeled vehicle.

According to an embodiment of this invention, the shock-absorbing suspension device includes a mounting rod, a wheel rod, a counteracting member, a primary linking bar, a cantilever arm, and a force transmitting member.

The mounting rod extends in an upright direction, and is adapted to be mounted on a wheeled vehicle frame. The wheel rod has a lower segment which is adapted to be mounted on a wheel axle to transmit upwards from the wheel axle a force of shock generated as a result of unevenness of a road surface, and an upper segment which extends from the lower segment in the upright direction to terminate at a top end that is jerked upwards and downwards when the shock force is transmitted upwards. The upper segment is disposed forward of the mounting rod in a longitudinal direction transverse to the upright direction.

The counteracting member includes a pivoted region which is pivotally mounted on the mounting rod about a pivoting axis in a transverse direction transverse to both the upright and longitudinal directions, and a counteracting body which extends from the pivoted region forward to terminate at a coupler area. The coupler area has a rearward end and a forward end opposite to each other in the upright direction.

The primary linking bar is disposed to couple one of the forward and rearward ends to the upper segment such that, as a result of upward or downward jerked movement of the top end, the one of the forward and rearward ends is brought by the primary linking bar to move downward or upwards so as to sway the counteracting body about the pivoting axis against the jerked movement, thereby dampening the shock force transmitted to the other one of the forward and rearward ends.

The cantilever arm is disposed to extend from the mounting rod in the longitudinal direction to terminate at a bearing end. The force transmitting member is disposed to couple the bearing end to the other one of the forward and rearward ends such that the dampened shock force is transmitted to the bearing end through the force transmitting member, thereby minimizing the impact of shock to the mounting rod.

In some embodiments, a secondary linking bar is disposed to couple the upper segment to the force transmitting member such that, in concert with the movement of the primary linking bar in response to the upward or downward jerked movement of the top end, the secondary linking bar imparts a force to the other one of the forward and rearward ends so as to help the primary linking bar to sway the counteracting body.

In some embodiments, a tertiary linking bar is disposed to couple the upper segment to the force transmitting member so as to cooperate with the secondary linking bar to form a mechanism of four-bar linkage.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION

Figure 1:
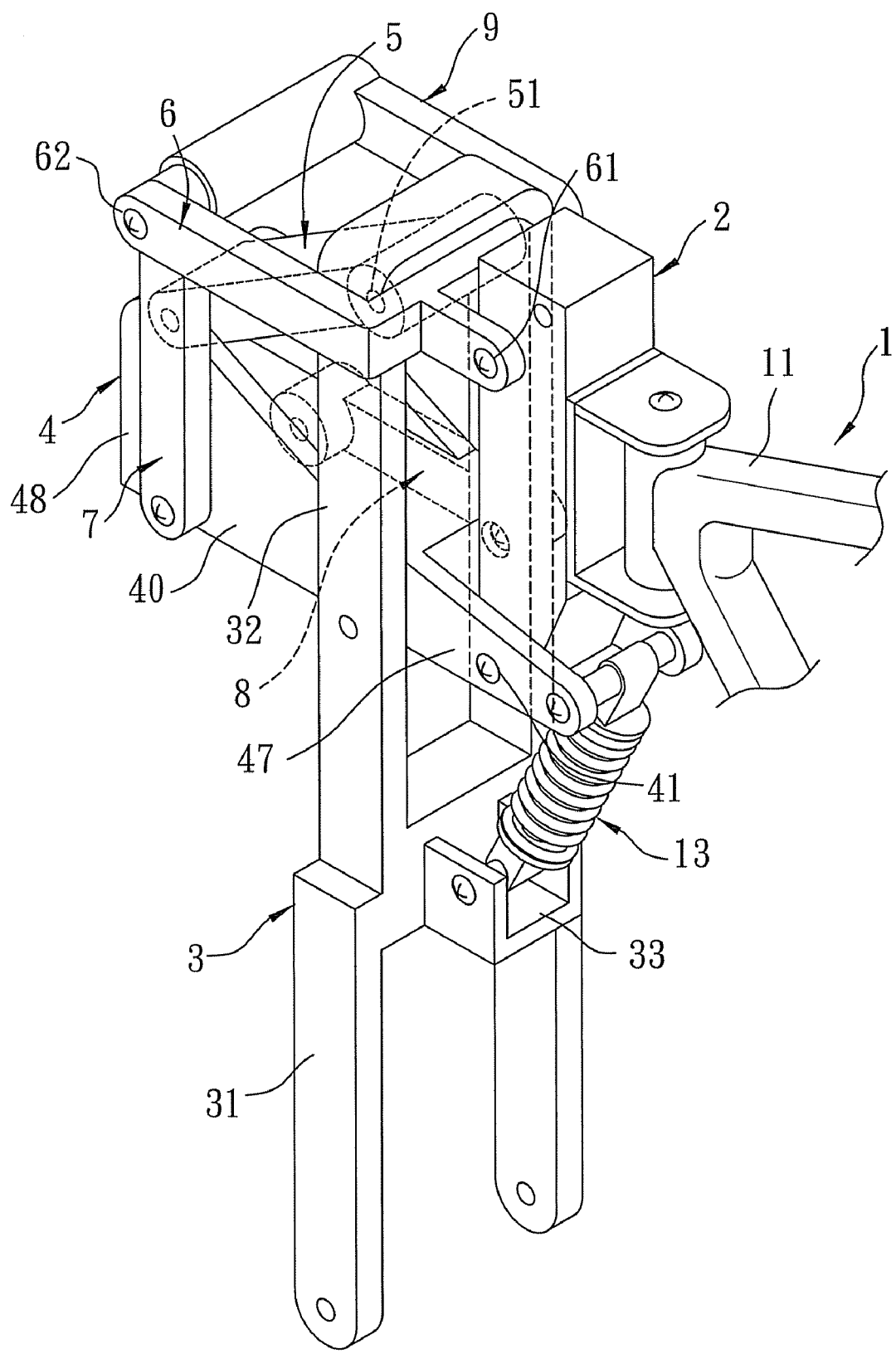
FIG. 1 is a perspective view of a first embodiment of a shock-absorbing suspension device according to this invention.

Before the present invention is described in greater detail, it should be noted that same reference numerals have been used to denote like elements throughout the specification.

Figure 2:
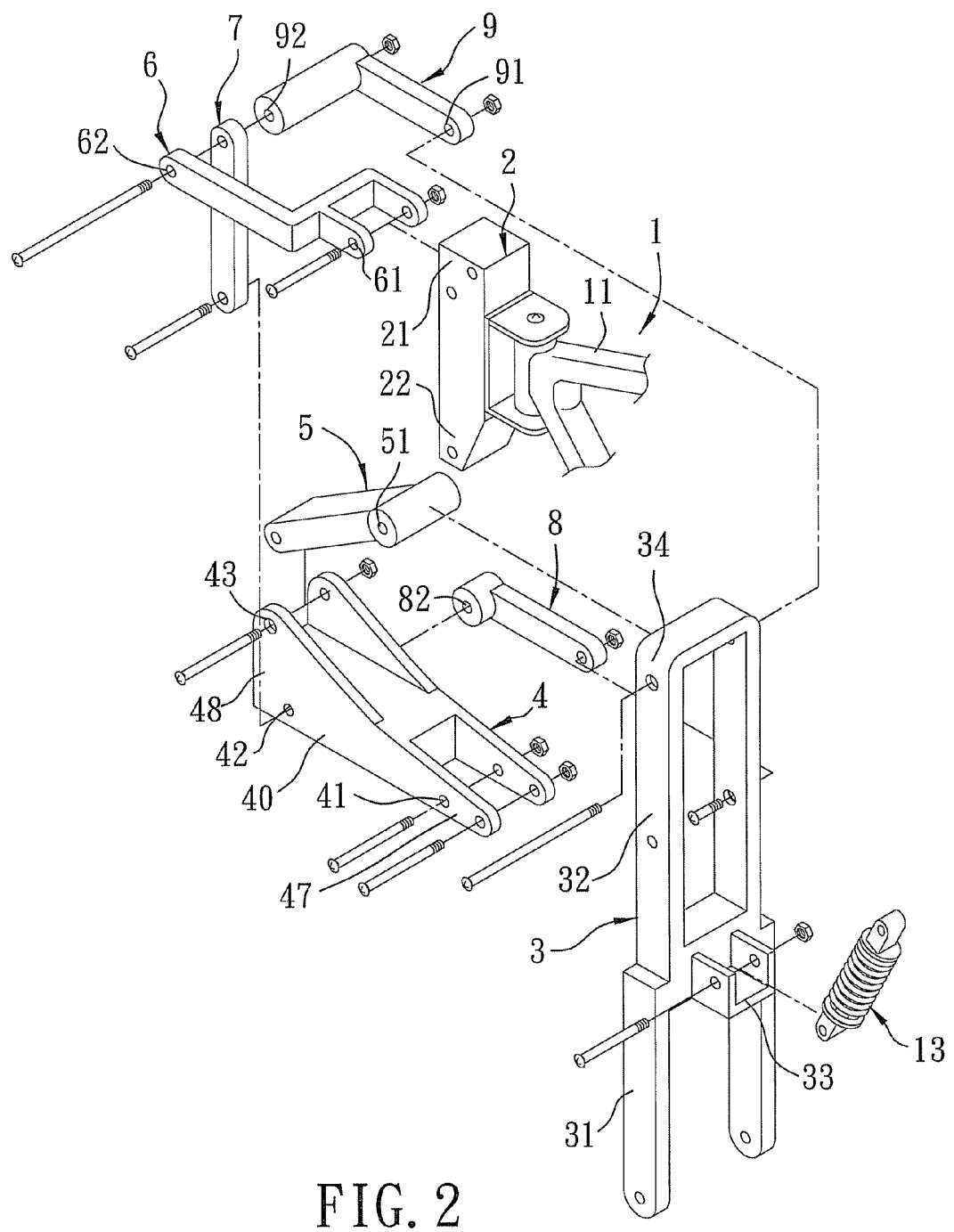
FIG. 2 is an exploded perspective view of the first embodiment.
Figure 3:
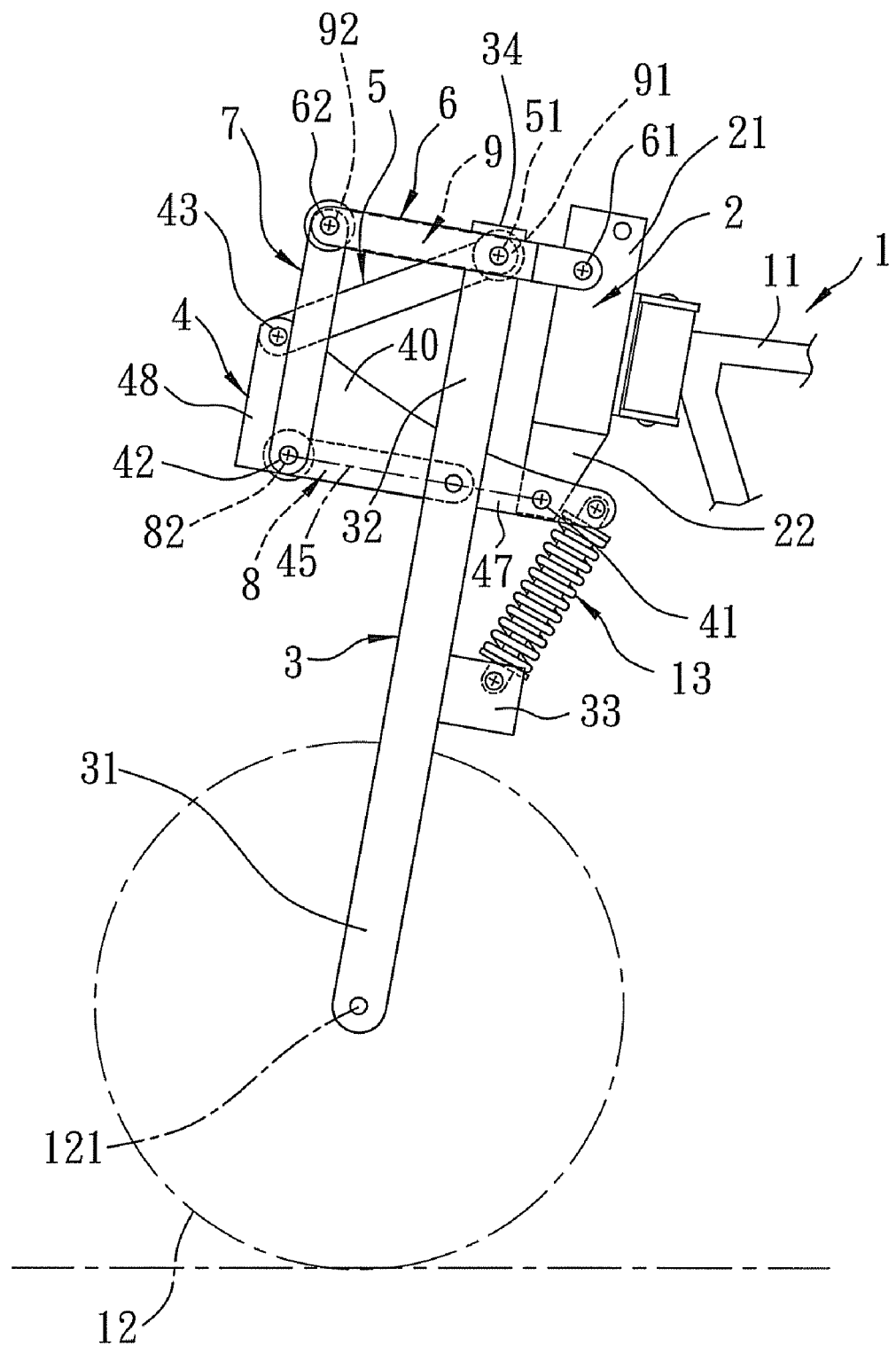
FIG. 3 is a schematic side view of the first embodiment.

Referring to FIGS. 1 to 3, a first embodiment of a shock-absorbing suspension device according to the present invention is shown to comprise a mounting rod 2, a wheel rod 3, a counteracting member 4, a primary linking bar 5, a cantilever arm 6, a force transmitting member 7, a secondary linking bar 8, a tertiary linking bar 9, and a spring-loaded shock-absorber 13.

The mounting rod 2, such as a steering rod, extends in an upright direction, has upper and lower ends 21,22, and is adapted to be rotatably mounted on a frame 11 of a wheeled vehicle 1, such as a motorcycle or a bicycle.

The wheel rod 3 has a fork-type lower segment 31 which is adapted to be mounted on a wheel axle 121 of a front wheel 12 of the wheeled vehicle 1 to transmit upwards from the wheel axle 121 a shock force that is generated as a result of passing of the wheeled vehicle 1 over an uneven road surface, and an upper segment 32 which extends from the lower segment 31 in the upright direction to terminate at a top end 34 that is jerked upwards and downwards when the shock force is transmitted upwards. The upper segment 32 is disposed forward of the mounting rod 2 in a longitudinal direction transverse to the upright direction.

The counteracting member 4 includes a fork-type pivoted region 47 which is pivotally mounted on the lower end 22 of the mounting rod 2 about a pivoting axis 41 in a transverse direction transverse to both the upright and longitudinal directions, and a counteracting body 40 which extends from the pivoted region 47 forward to terminate at a coupler area 48. The coupler area 48 has a rearward end 42 and a forward end 43 which is forward of the rearward end 42 and which is opposite to the rearward end 42 in the upright direction. In this embodiment, the rearward end 42 is disposed downwardly of the forward end 43.

The primary linking bar 5 is disposed to couple the forward end 43 to the upper segment 32 adjacent to the top end 34. Thus, as a result of upward or downward jerking movement of the top end 34 of the wheel rod 3 when the wheel 12 is passing over an uneven road surface, the forward end 43 is brought to move downward or upwards by the primary linking bar 5 so as to sway the counteracting body 40 about the pivoting axis 41 against the jerking movement, thereby dampening the shock force transmitted to the rearward end 42.

The cantilever arm 6 has a rear bearing end 61 which is pivotally connected to the upper end 21 of the mounting rod 2, and extends in the longitudinal direction to terminate at a front bearing end 62.

The force transmitting member 7 is disposed to couple the rear bearing end 62 to the rearward end 42 of the counteracting body 40 such that the dampened shock force is transmitted to the rear bearing end 62 through the force transmitting member 7, thereby minimizing the impact of the shock force on the mounting rod 2.

The secondary linking bar 8 is disposed to couple the upper segment 32 directly to the force transmitting member 7. In this embodiment, the secondary linking bar 8 is shorter than, and is disposed below, the primary linking bar 5. Thus, in concert with the movement of the primary linking bar 5 in response to the upward or downward jerking movement of the wheel rod 3, the secondary linking bar 8 imparts a force to the rearward end 42 so as to help the primary linking bar 5 sway the counteracting body 40.

The tertiary linking bar 9 is disposed to couple the upper segment 32 to the force transmitting member 7, and is parallel to the secondary linking bar 8. Thus, the tertiary linking bar 9, the secondary linking bar 8, the upper segment 32, and the coupler area 48 cooperatively form a four-bar linkage mechanism.

The spring-loaded shock-absorber 13 is a mechanism disposed to couple a mounting rack 33 of the wheel rod 3 to the pivoted region 47 of the counteracting member 4 at a position that is rearward of the pivoting axis 41. It is noted that the number and position of the spring-loaded shock-absorber 13 described above are for purposes of illustration only and are not intended to limit the scope of this invention.

In this embodiment, the primary linking bar 5 has a rear swing end 51 which is pivotally mounted on the upper segment 32. The tertiary linking bar 9 has a front linking end 92 which is pivotally mounted on the force transmitting member 7 and which is coaxial with the front bearing end 62, and a rear linking end 91 which is pivotally mounted on the upper segment 32 and which is coaxial with the rear swing end 51. It is noted that the rear linking end 91 may be disposed upwardly of the rear swing end 51, and the front bearing end 62 may be disposed upwardly of the front linking end 92.

In this embodiment, the secondary linking bar 8 has a front swing end 82 which is pivotally mounted on the force transmitting member 7 and which is coaxial with the rearward end 42.

Figure 4:
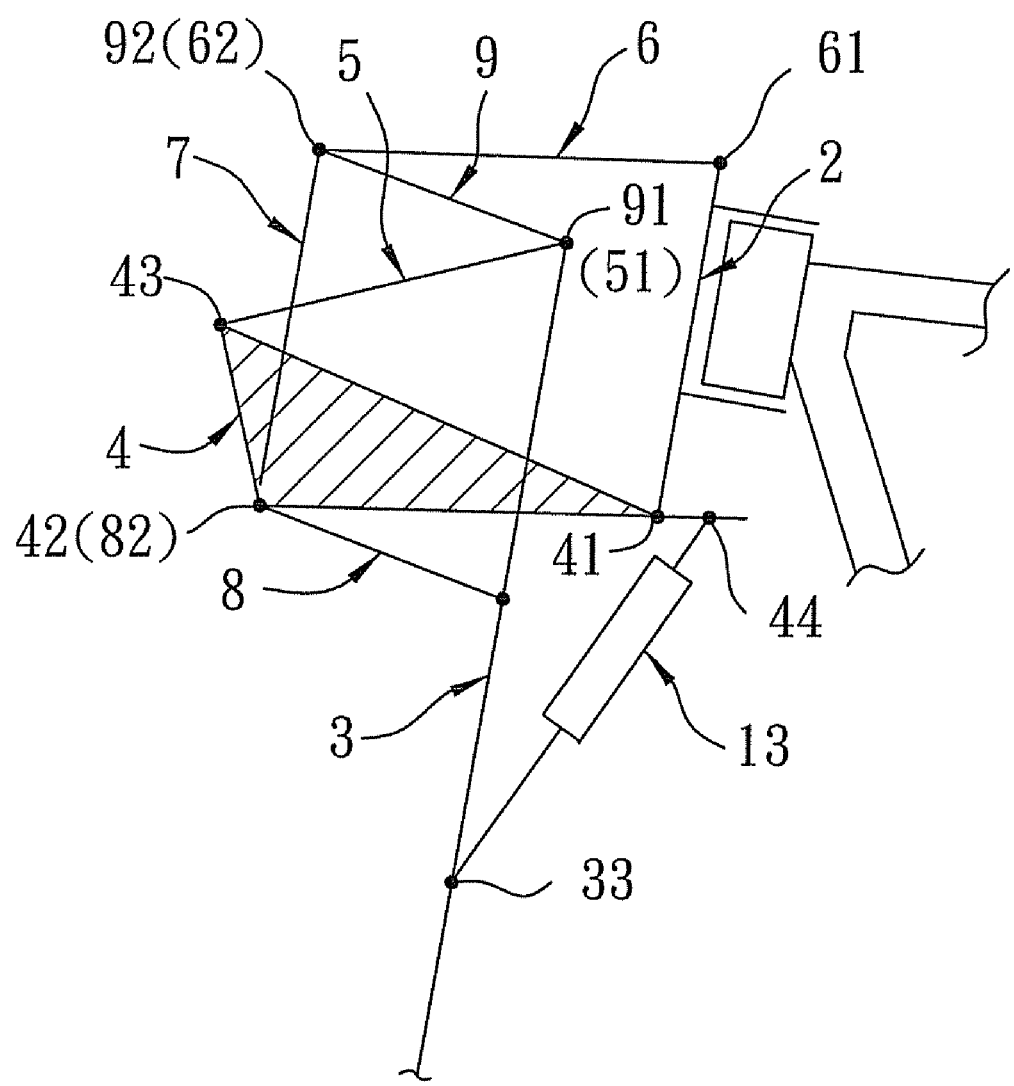
FIG. 4 is a schematic diagram of the first embodiment in a non-use state.
Figure 5:
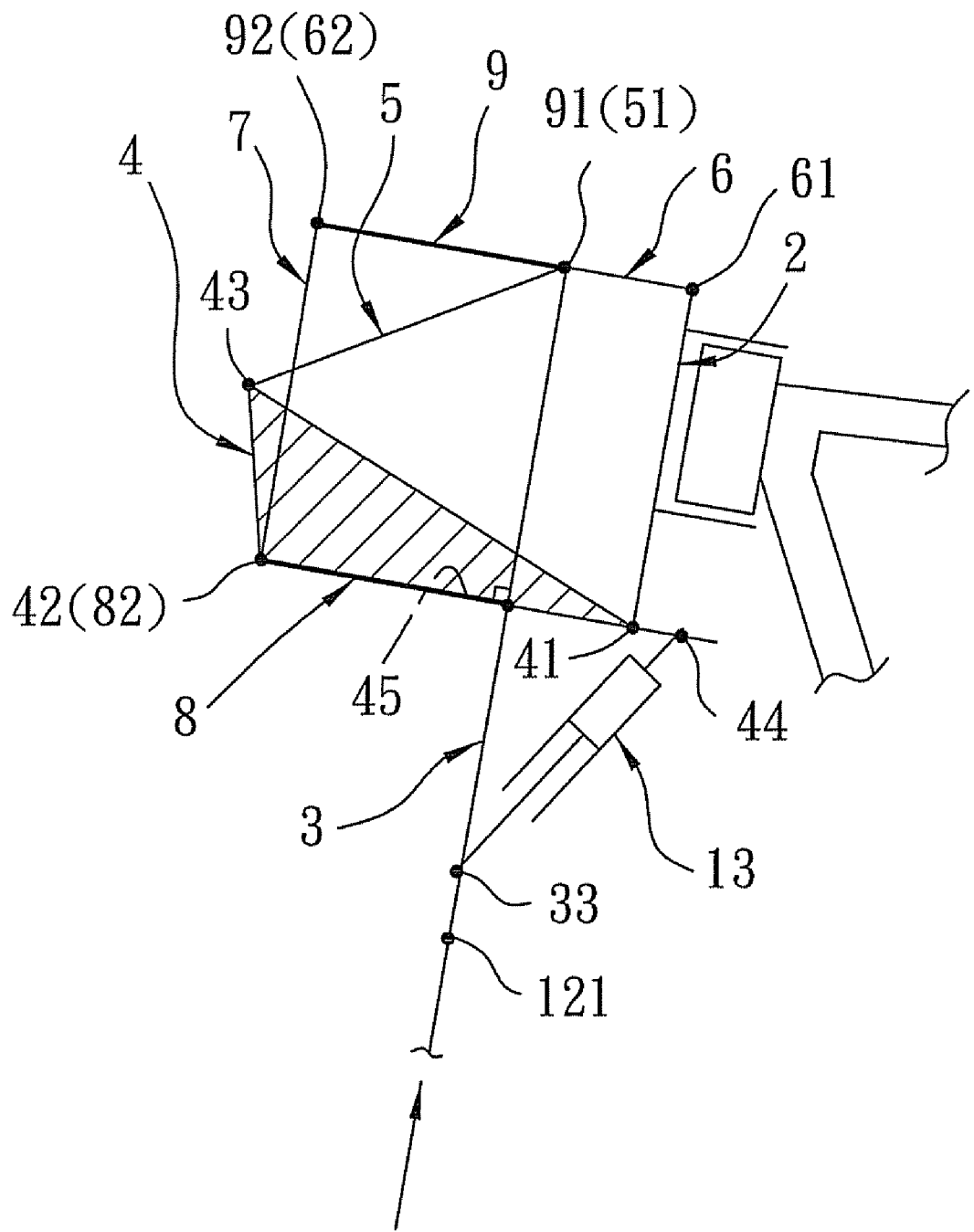
FIG. 5 is a schematic diagram of the first embodiment in a state of use.

FIG. 4 shows the suspension device in a non-use state, where the spring-loaded shock-absorber 13 is not compressed. FIG. 5 shows the suspension device in a state of use where the rider is seated on the bicycle frame 11. In this state, the mounting rod 2 and the wheel rod 3 are perpendicular to a straight line 45 drawn between the pivoting axis 41 and the rearward end 42.

Figure 6:
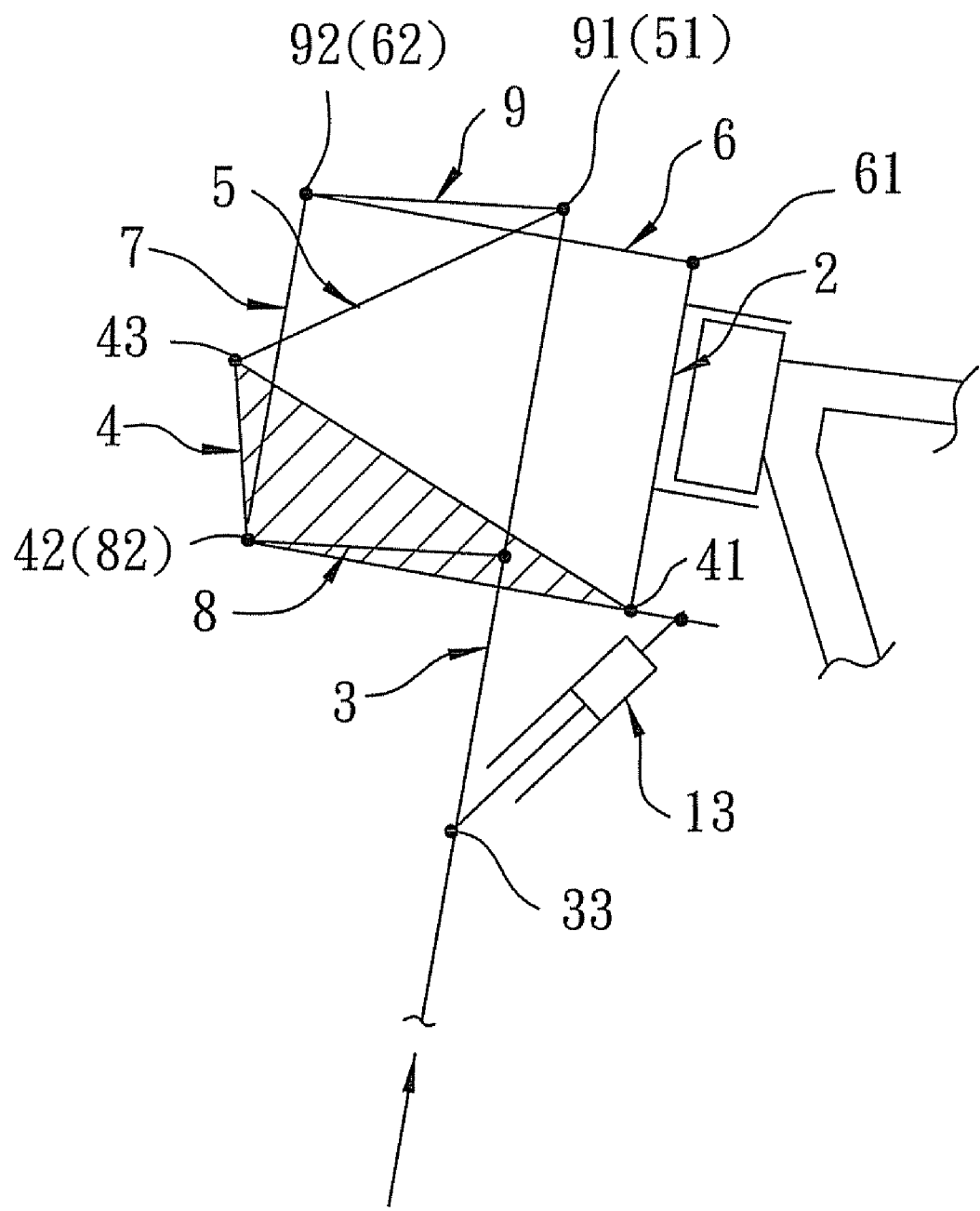
FIG. 6 is a schematic diagram of the first embodiment in a state where a wheel is passing over a bumpy roadway.

When the front wheel 12 moves over a bumpy road surface, as shown in FIG. 6, the counteracting body 40 is swung about the pivoting axis 41 through the primary, secondary and tertiary linking bars 5,8,9, thereby dampening the shock force transmitted to the counteracting body 40. The shock force is further dampened through the force transmitting member 7 and the cantilever arm 6. Moreover, through compression of the spring-loaded shock-absorber 13, the impact of the shock force to the mounting rod 2 can be minimized. The suspension device of this invention can be returned to the state shown in FIG. 5 by virtue of the restoring force of the spring-loaded shock-absorber 13.

As illustrated, by such a shock-absorbing suspension device, the shock force as a result of upward or downward jerked movement of the wheel rod 3 can be transmitted to the primary, secondary and tertiary linking bars 5,8,9 to swing the counteracting body 40 about the pivoting axis 41 so that the shock force is dampened. The dampened shock force is then transmitted to the force transmitting member 7 and the cantilever arm 6 so that the shock force is further minimized to be imparted to the mounting rod 2. Thus, the shock force can be effectively dampened to be transmitted to the frame 11 of the wheeled vehicle 1.

Figure 7:
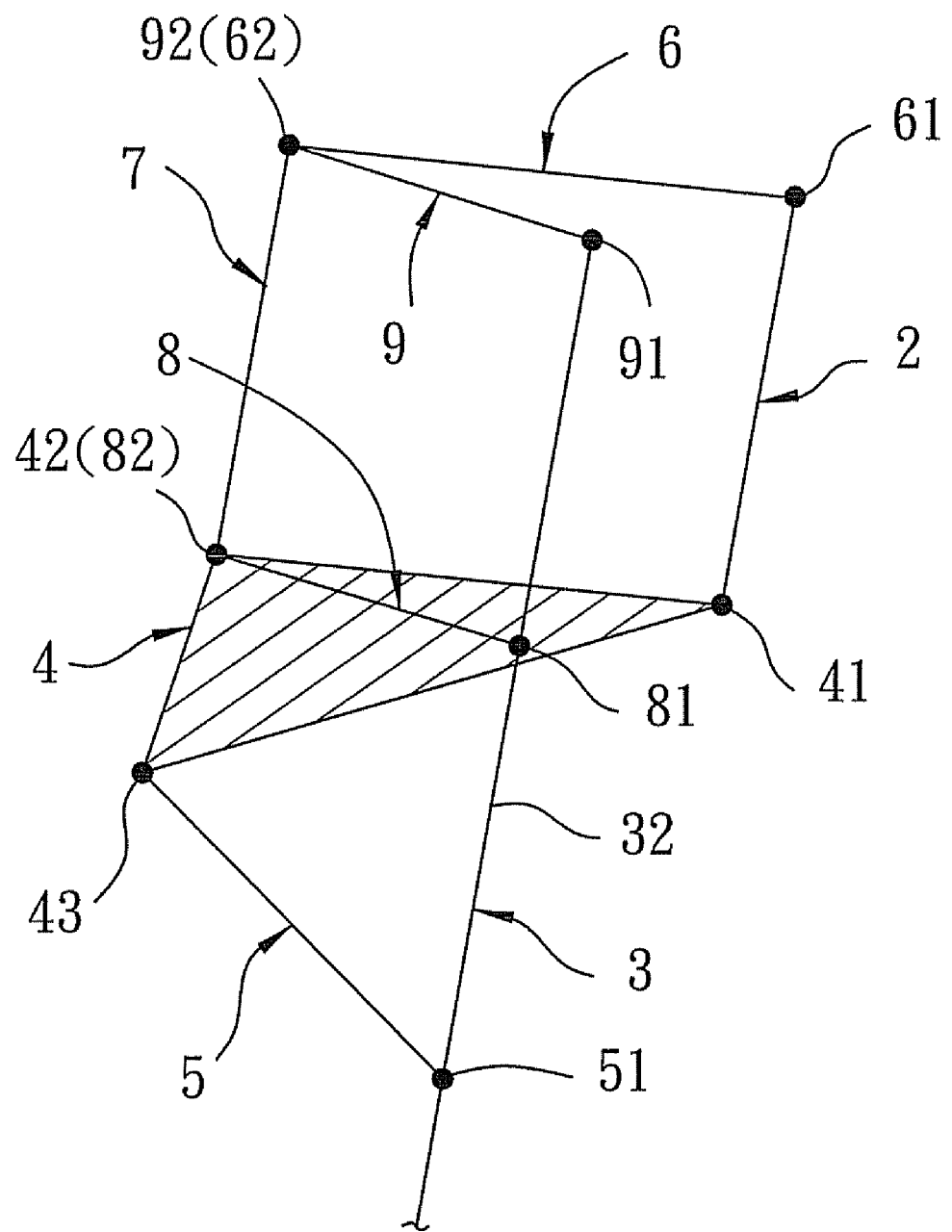
FIG. 7 is a schematic diagram of a second embodiment of a shock-absorbing suspension device according to this invention in a state of use.

Referring to FIG. 7, a second embodiment of a shock-absorbing suspension device according to this invention is shown to be similar to the first embodiment in construction, except that the forward end 43 in this embodiment is disposed downwardly of the rearward end 42 such that the primary linking bar 5, which is pivotally connected to the forward end 43, is disposed downwardly of the force transmitting member 7, which is pivotally connected to the rearward end 42. In addition, the primary linking bar 5 is disposed downwardly of the secondary and tertiary linking bars 8,9.

Figure 8:
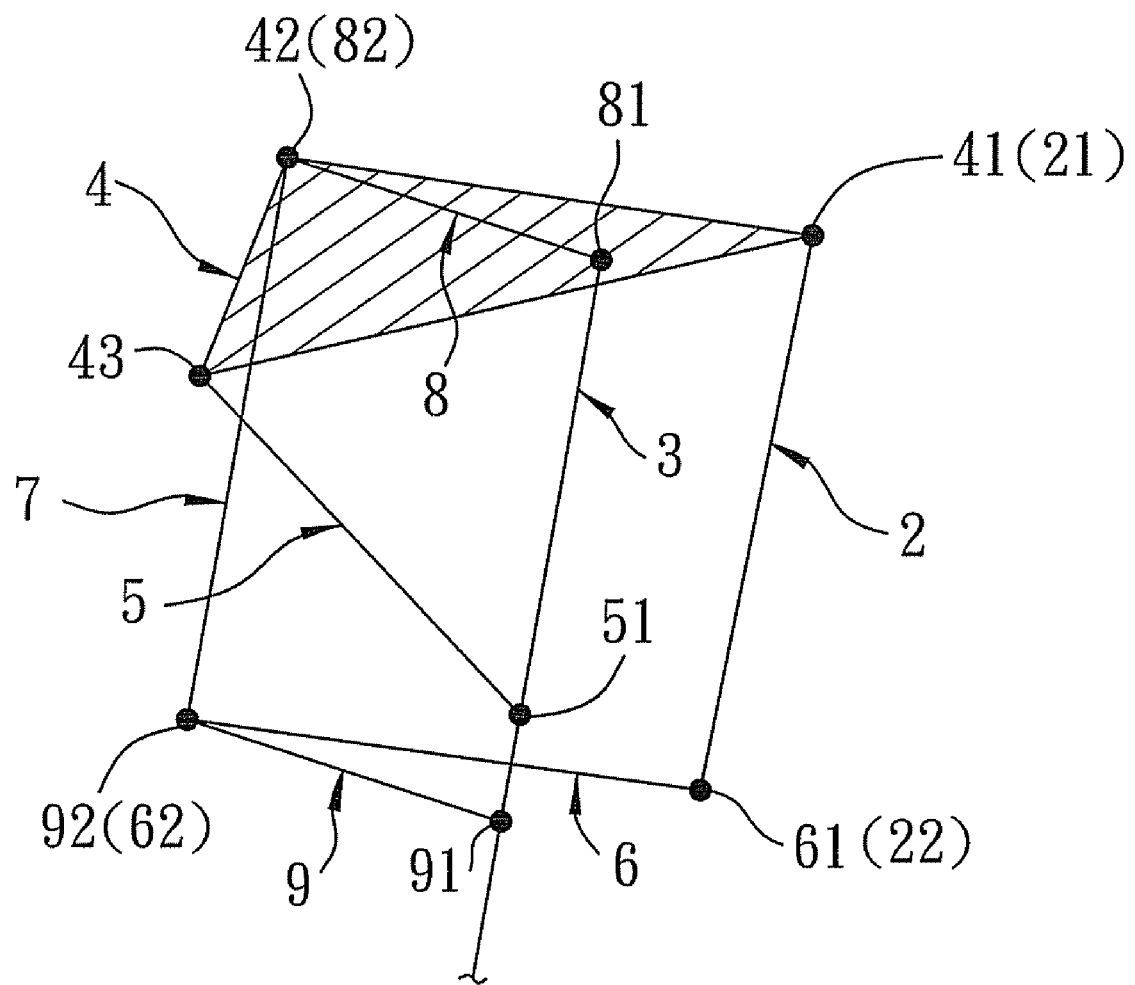
FIG. 8 is a schematic diagram of a third embodiment of a shock-absorbing suspension device according to this invention in a state of use.

Referring to FIG. 8, a third embodiment of a shock-absorbing suspension device according to this invention is shown to be similar to the first embodiment in construction, except that the counteracting member 4 in this embodiment is disposed upwardly of the cantilever arm 6 and the tertiary linking bar 9. Specifically, the pivoted region 47 of the counteracting member 4 is pivotally mounted on the upper end 21 of the mounting rod 2, and the rear bearing end 61 of the cantilever arm 6 is pivotally mounted on the lower end 22 of the mounting rod 2. In this embodiment, like the first embodiment, the front swing end 82 of the secondary linking bar 8, which is pivotally mounted on the force transmitting member 7, is coaxial with the rearward end 42, and the front linking end 92 of the tertiary linking bar 9, which is pivotally mounted on the force transmitting member 7, is coaxial with the front bearing end 62 of the cantilever arm 6. It is noted that the front swing end 82 may be disposed downwardly of the rearward end 42, and the tertiary linking bar 9 may be disposed upwardly or downwardly of the cantilever arm 6.

Figure 9:
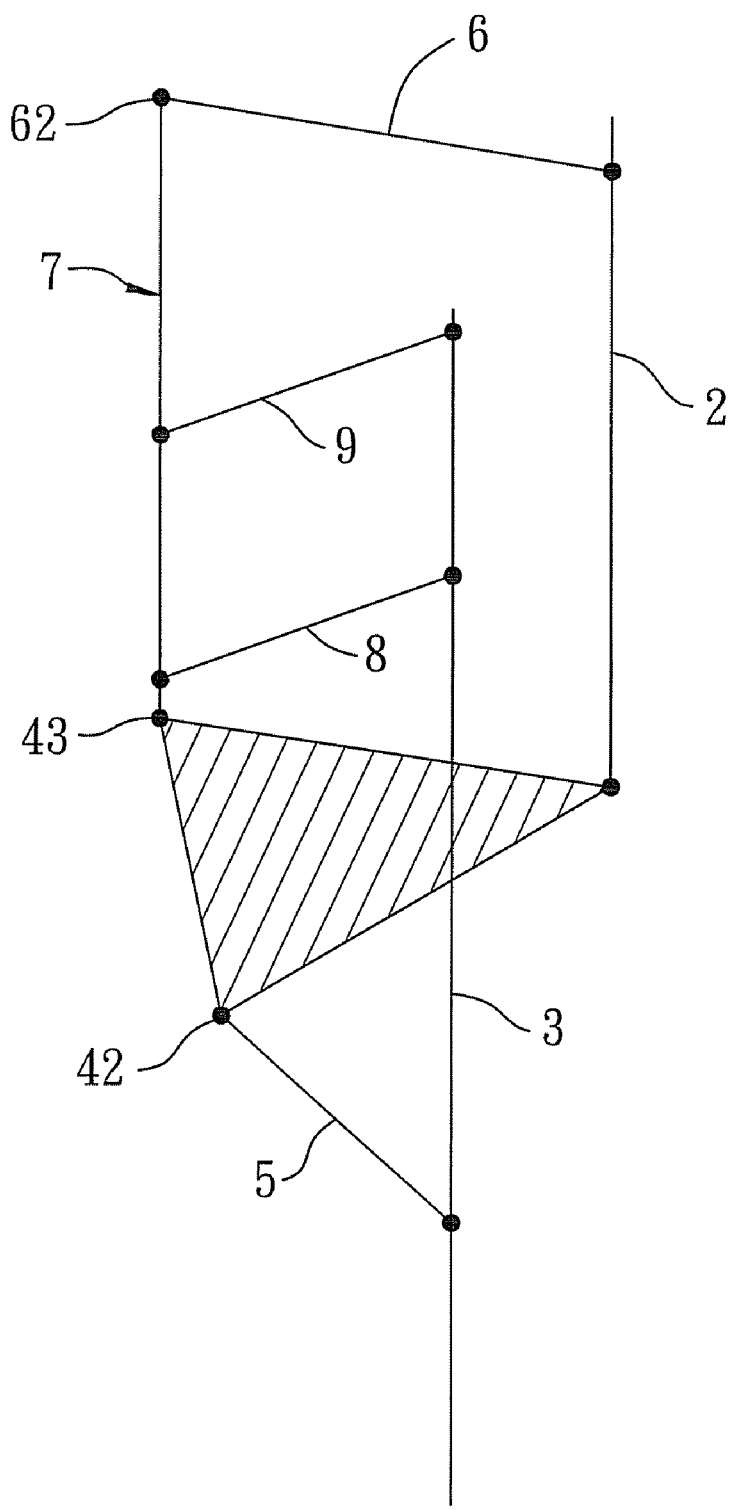
FIG. 9 is a schematic diagram of a fourth embodiment of a shock-absorbing suspension device according to this invention in a state of use.

Referring to FIG. 9, a fourth embodiment of a shock-absorbing suspension device according to this invention is shown to be similar to the first embodiment in construction, except that the force transmitting member 7 and the primary linking bar 5 in this embodiment are connected pivotally and respectively to the forward end 43 and the rearward end 42. Hence, the primary linking bar 5 is disposed downwardly of the secondary and tertiary linking bars 8,9.

Figure 10:
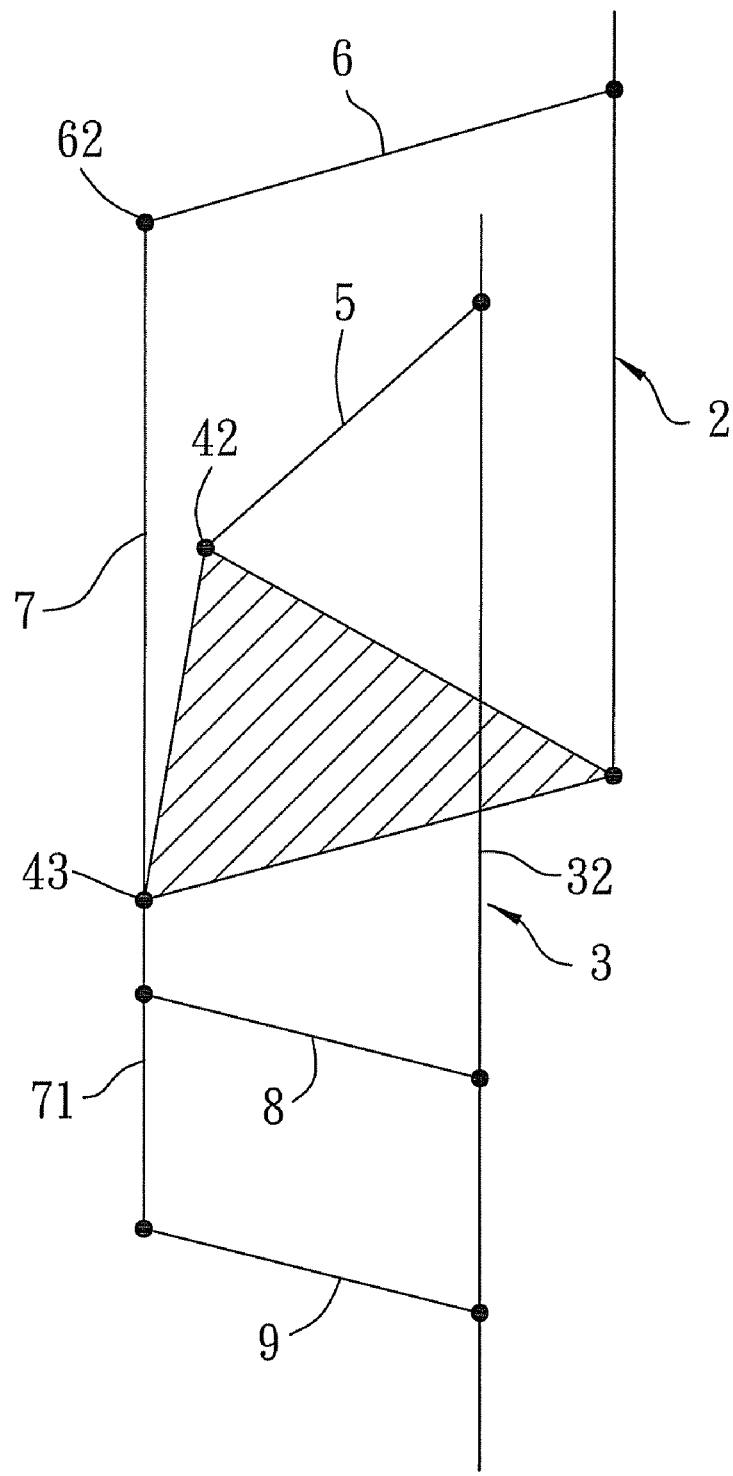
FIG. 10 is a schematic diagram of a fifth embodiment of a shock-absorbing suspension device according to this invention in a state of use.

Referring to FIG. 10, a fifth embodiment of a shock-absorbing suspension device according to this invention is shown to be similar to the fourth embodiment in construction, except that the rearward end 42 in this embodiment is disposed upwardly of the forward end 43 such that the primary linking bar 5, which is pivotally connected to the rearward end 42, is disposed rearward of the force transmitting member 7, which is pivotally connected to the forward end 43. In addition, the force transmitting member 7 has a lower coupled segment 71 which extends downwardly from the forward end 43. The secondary and tertiary linking bars 8,9 are disposed to couple the lower coupled segment 71 to the upper segment 32.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A shock-absorbing suspension device adapted to couple a frame of a wheeled vehicle with a wheel axle, comprising:
    a mounting rod which extends in an upright direction, and which is adapted to be mounted on the frame;
    a wheel rod having a lower segment which is adapted to be mounted on the wheel axle to transmit upwards from the wheel axle a shock force generated as a result of passing of the wheeled vehicle over an uneven road surface, and an upper segment which extends from said lower segment in the upright direction to terminate at a top end that is jerked upwards and downwards when the shock force is transmitted upwards, said upper segment being disposed forward of said mounting rod in a longitudinal direction transverse to the upright direction;
    a counteracting member including a pivoted region which is pivotally mounted on said mounting rod about a pivoting axis in a transverse direction transverse to both the upright and longitudinal directions, and a counteracting body configured to extend forward from said pivoted region to terminate at a coupler area, said coupler area having a rearward end and a forward end which is forward of said rearward end and which is opposite to said rearward end in the upright direction;
    a primary linking bar disposed to couple one of said forward and rearward ends to said upper segment such that, as a result of upward or downward jerking movement of said top end, said one of said forward and rearward ends is brought to move downwards or upwards by said primary linking bar so as to sway said counteracting body about the pivoting axis against the jerking movement, thereby dampening the shock force transmitted to the other one of said forward and rearward ends;
    a cantilever arm disposed to extend from said mounting rod in the longitudinal direction to terminate at a bearing end;
    a force transmitting member disposed to couple said bearing end to the other one of said forward and rearward ends such that the dampened shock force is transmitted to said bearing end through said force transmitting member, thereby minimizing impact of the shock force on said mounting rod; and
    a secondary linking bar disposed to couple said upper segment to said force transmitting member such that, in concert with movement of said primary linking bar in response to the upward or downward jerking movement of said top end, said secondary linking bar imparts a force to said other one of said forward and rearward ends so as to help said primary linking bar sway said counteracting body, said secondary linking bar is disposed to couple said upper segment directly to said other one of said forward and rearward ends.

2. The shock-absorbing suspension device according to claim 1, further comprising a tertiary linking bar disposed to couple said upper segment to said force transmitting member so as to cooperate with said secondary linking bar to form a four-bar linkage mechanism.

3. The shock-absorbing suspension device according to claim 2, wherein said tertiary linking bar is parallel to said secondary linking bar.

4. The shock-absorbing suspension device according to claim 3, wherein said force transmitting member has a lower coupled segment which extends downwardly from said one of said forward and rearward ends, said secondary and tertiary linking bars being disposed to couple said lower coupled segment to said upper segment.

5. The shock-absorbing suspension device according to claim 1, wherein said mounting rod has upper and lower ends opposite to each other in the upright direction, said pivoted region is pivotally mounted on said lower end, and said cantilever arm is pivotally mounted on said upper end.

6. The shock-absorbing suspension device according to claim 1, wherein said mounting rod has upper and lower ends opposite to each other in the upright direction, said pivoted region being pivotally mounted on said upper end, said cantilever arm being pivotally mounted on said lower end.

7. A shock-absorbing suspension device adapted to couple a frame of a wheeled vehicle with a wheel axle, comprising:
    a mounting rod which extends in an upright direction, and which is adapted to be mounted on the frame;
    a wheel rod having a lower segment which is adapted to be mounted on the wheel axle to transmit upwards from the wheel axle a shock force generated as a result of passing of the wheeled vehicle over an uneven road surface, and an upper segment which extends from said lower segment in the upright direction to terminate at a top end that is jerked upwards and downwards when the shock force is transmitted upwards, said upper segment being disposed forward of said mounting rod in a longitudinal direction transverse to the upright direction;
    a counteracting member including
    a pivoted region which is pivotally mounted on said mounting rod about a pivoting axis in a transverse direction transverse to both the upright and longitudinal directions, and
    a counteracting body configured to extend forward from said pivoted region to terminate at a coupler area, said coupler area having a rearward end and a forward end which is forward of said rearward end and which is opposite to said rearward end in the upright direction;
    a primary linking bar disposed to couple one of said forward and rearward ends to said upper segment such that, as a result of upward or downward jerking movement of said top end, said one of said forward and rearward ends is brought to move downwards or upwards by said primary linking bar so as to sway said counteracting body about the pivoting axis against the jerking movement, thereby dampening the shock force transmitted to the other one of said forward and rearward ends;

a cantilever arm disposed to extend from said mounting rod in the longitudinal direction to terminate at a bearing end;

a force transmitting member disposed to couple said bearing end to the other one of said forward and rearward ends such that the dampened shock force is transmitted to said bearing end through said force transmitting member, thereby minimizing impact of the shock force on said mounting rod; and a spring-loaded shock-absorber disposed to couple said wheel rod to said pivoted region at a position that is rearward of said pivoting axis.

* * * * *